(12) United States Patent  
Payne et al.

(10) Patent No.: US 11,897,446 B2
(45) Date of Patent: Feb. 13, 2024

(54) NAVIGATION SYSTEMS AND METHODS USING TURN DETECTION (71) Applicant: Toyota Motor Engineering & Manufacturing North America, Inc., Plano, TX (US)

(72) Inventors: Joshua D. Payne, Ann Arbor, MI (US); Heraldo Stefanon, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 1078 days.

(21) Appl. No.: 16/125,956

(22) Filed: Sep. 10, 2018

(65) Prior Publication Data

US 2020/0079346 A1 Mar. 12, 2020

(51) Int. Cl.
*B60W 20/12* (2016.01)
*G01C 21/34* (2006.01)

(52) U.S. Cl.
CPC ......... *B60W 20/12* (2016.01); *G01C 21/3415* (2013.01); *B60W 2510/244* (2013.01); *B60Y 2200/92* (2013.01)

(58) Field of Classification Search
CPC ............ B60W 20/12; B60W 2510/244; G01C 21/3415; B60Y 2200/92
See application file for complete search history.

(56) References Cited

U.S. PATENT DOCUMENTS 6,674,434 B1 * 1/2004 Chojnacki .............. G01C 21/32 345/428
8,315,798 B2 11/2012 Shikimachi et al.
(Continued)

FOREIGN PATENT DOCUMENTS

CA 2819441 A1 2/2014
CN 105444770 A 3/2016
(Continued)

OTHER PUBLICATIONS

Tao Wu, et al., "Updating Road Networks By Local Renewal From GPS Trajectories", https://pdfs.semanticscholar.org/2104/6af98416329e6d45a60868ba5716d2d0eb23.pdf; Published Sep. 12, 2016, International Journal of Geo-Information.
(Continued)

*Primary Examiner* — James M McPherson
*Assistant Examiner* — Bakari Underwood
(74) *Attorney, Agent, or Firm* — Dinsmore & Shohl LLP (57) ABSTRACT

A navigation system for generating turn segments includes a processor, a memory module communicatively coupled to the processor, a segment list stored in the memory module that includes a plurality of known segments, and machine readable instructions stored in the memory module. The machine readable instructions cause the navigation system to identify a current location of the navigation system, search the segment list for at least one known segment candidate that is within a threshold distance of the current location, determine whether at least one known segment candidate from the segment list includes the current location, track turn movements of the navigation system to form an unknown segment in response to determining at least one known segment candidate does not include the current location, and to link the unknown segment to the plurality of known segments from the segment list.

20 Claims, 3 Drawing Sheets

(56) References Cited

U.S. PATENT DOCUMENTS

| | | | |
|---|---|---|---|
| 9,322,660 B2 | 4/2016 | Mund | |
| 9,816,823 B2 | 11/2017 | Wang et al. | |
| 2007/0156334 A1* | 7/2007 | Vu | G01C 21/3415 701/416 |
| 2010/0014712 A1* | 1/2010 | Sampedro Diaz | G01C 21/32 382/104 |
| 2014/0148970 A1* | 5/2014 | Dufford | G01C 21/3617 701/1 |
| 2015/0275788 A1* | 10/2015 | Dufford | F02N 11/0837 701/102 |
| 2015/0285639 A1 | 10/2015 | Basalamah et al. | |
| 2018/0350144 A1* | 12/2018 | Rathod | G06Q 20/3276 |

FOREIGN PATENT DOCUMENTS

| | | |
|---|---|---|
| IN | 104819726 | 8/2015 |
| WO | 2005015129 A1 | 2/2005 |

OTHER PUBLICATIONS

Title: CrowdAtlas: self-updating maps for cloud and personal use
Yin Wang, et al., "CrowdAtlas: Self-updaitng Maps For Cloud and Personal Use", URL: http://web.eecs.umich.edu/~yinw/publication/mobisys13-final.pdf; Published: Jun. 25-28, 2013; Journal reference: MobiSys'13.

\* cited by examiner

NAVIGATION SYSTEMS AND METHODS USING TURN DETECTION

TECHNICAL FIELD

The present specification generally relates to navigation systems for integrating unknown route segments into a digital map by detecting turns made by a vehicle, and in particular for mapping unidentified route segments in areas where a digital map are devoid of pre-mapped segments.

BACKGROUND

Vehicles, such as hybrid vehicles, may improve their fuel efficiency, drivability, and driver comforts by predetermining whether to use the battery or the engine to reach the driver's projected destination and the proper moments to change power train controls during the route. Many vehicles include navigation systems, such as Global Positioning Systems (GPS), that store or access digital maps having a series of preprogrammed route segments that interconnect numerous destinations together. Such digital maps, while including a plethora of route segments uploaded therein, are commonly lacking preprogrammed segments in certain areas, for example rural areas and other underdeveloped regions. A driver seeking to travel to a destination in such areas are inhibited from improving the fuel efficiency of their vehicle as the vehicle's navigation system is unable to predetermine the travel route due to the deficiency of preprogrammed segments in the digital map for these areas.

Accordingly, a need exists for a system that tracks and records data pertaining to the movement of a vehicle for creating new turn segments to be uploaded onto a digital map, thereby improving the fuel efficiency of the vehicle on subsequent trips.

SUMMARY

In one embodiment, a navigation system for generating turn segments includes a processor, a memory module communicatively coupled to the processor, a segment list stored in the memory module that includes a plurality of known segments, and machine readable instructions stored in the memory module. The machine readable instructions cause the navigation system to identify a current location of the navigation system, search the segment list for at least one known segment candidate that is within a threshold distance of the current location, determine whether at least one known segment candidate from the segment list includes the current location, track turn movements of the navigation system to form an unknown segment in response to determining at least one known segment candidate does not include the current location, and to link the unknown segment to the plurality of known segments from the segment list.

In another embodiment, a method of segmenting a route in a mapping system for an unknown area includes receiving a signal at a navigation system from a GPS satellite; processing the signal into a current geographical location of the navigation system; accessing a segment list stored within a memory of the navigation system, wherein the segment list comprises a plurality of known segments that includes geographical location data; determining whether at least one known segment from the segment list includes geographical location data that is identical to the current geographical location of the navigation system; recording a new segment for storage in the memory of the navigation when at least one known segment does not include geographical location data that is identical to the current geographical location of the navigation system; monitoring physical turns of the navigation system; and terminating the new segment in response to detecting physical turns by the navigation system.

In another embodiment, a vehicle includes a system comprising a processor and a memory module, wherein the memory module is communicatively coupled to the processor and includes a plurality of known segments and logic instructions stored therein, wherein the plurality of known segments each comprise geographical data, wherein the processor is operable to execute the logic instructions to: identify a current location of the vehicle; compare the current location to the geographical data of the plurality of known segments to determine if the geographical data of at least one known segment is similar to the current location; record an unknown segment for storage in the memory module when the current location is dissimilar from the geographical data of the plurality of known segments by a predetermined threshold; and cease recording the unknown segment when the current location is similar to the geographical data of at least one known segment or when the vehicle performs a turn.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to navigation systems, such as those contained in vehicles, that are in communication with a Global Positioning System (GPS) to determine whether the current location of the navigation system is on a preprogrammed segment of a digital map. The navigation system may identify the current route of the vehicle based on GPS data (e.g., latitude, longitude, heading, etc.) and determine whether a mapping database includes a mapped-segment (i.e., a known segment) for the current route. In some instances, when GPS data of the current route does not exist (i.e., an unknown segment), the navigation system may initiate tracking to detect any turns made by the vehicle to create newly recorded segments. The new segments may be saved onto a digital map database for future use by the navigation system of the vehicle, which may assist route prediction processes of the navigation system in improving the vehicle's fuel efficiency, as one example. Any number of vehicle systems may utilize map segmenting and route prediction processes described herein. In some versions, the new turn segments may be uploaded onto a cloud-based digital map for future use by other navigation systems in communication with the cloud-based database.

The embodiments disclosed herein will be described with reference to the terms "location," "segment," and "route." As used herein, "location" means a unique geographic coordinate defined with reference to a coordinate system, such as a geographic location defined by a particular latitude and longitude. As used herein, "segment" means an ordered series of locations, such as a series of locations between turns. As used herein, "route" refers to a segment that a navigation system is currently located on and is generally a travel path of the vehicle between locations.

Figure 1:
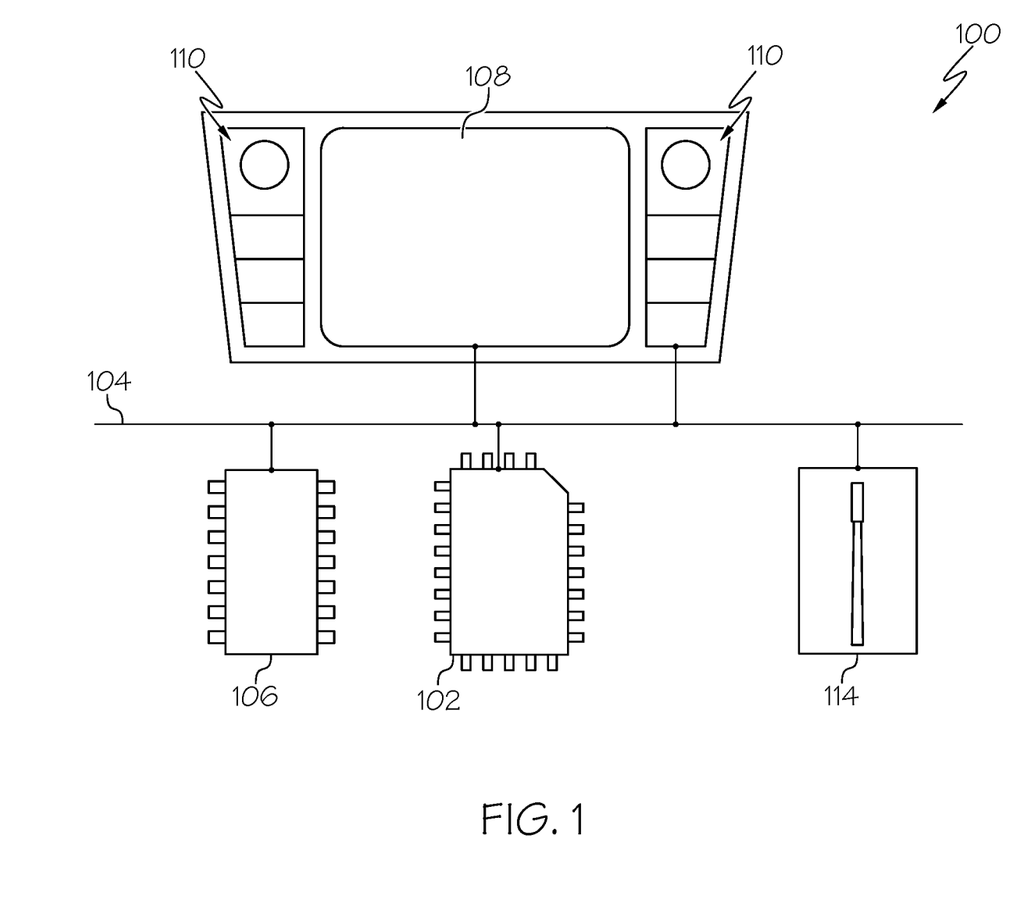
FIG. 1 schematically depicts a navigation system according to one or more embodiments shown and described herein.

Referring now to FIG. 1, an embodiment of a navigation system 100 is schematically depicted. It is noted that, while the navigation system 100 is depicted in isolation, the navigation system 100 can be coupled to a vehicle. The vehicle may be an automobile or any other passenger or non-passenger vehicle such as, for example, a terrestrial, aquatic, and/or airborne vehicle. The navigation system 100 may be embedded within a mobile device (e.g., smartphone, laptop computer, etc.) carried by a driver of the vehicle.

The navigation system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the navigation system. Accordingly, the communication path 104 may communicatively couple any number of processors with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The navigation system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a dynamic database (e.g., digital map) that includes geographical information pertaining to preprogrammed, known segments. The dynamic database may be stored locally (i.e. a local digital map stored on the navigation system) or may be uploaded from a remote location (i.e. a cloud-based digital map that the navigation system is in communication with) such that the geographical information pertaining is temporal and is updated pursuant to the programmed segments stored by other operators in communication with the dynamic database.

In embodiments that include a dynamic database, the database generally includes a segment list. The segment list may include a plurality of preprogrammed, known segments. Each known segment of the plurality of preprogrammed segments in the segment list may include a segment identifier, a segment distance, one or more "to" segments, one or more "from" segments, and a plurality of preprogrammed locations. The segment identifier may be a unique identifier that allows a particular segment to be distinguished from other segments. The segment distance may be representative of the total distance of the segment (e.g., the distance from the starting location of the segment to the ending location of the segment, or the sum of the distances between each pair of successive locations in the segment). The one or more "to" segments may include segment identifiers for segments immediately adjacent to (i.e. before) the current segment that a navigation system is positioned on, relative to the direction of travel and/or heading of the navigation system. The one or more "from" segments may include segment identifiers for segments immediately adjacent to (i.e. after) the current segment relative to the direction of travel of the navigation system on the current segment.

Each location of the plurality of preprogrammed locations may include location data, such as latitude, longitude, altitude, speed, course, heading, etc. It should be understood that in other embodiments, each segment in the segment list may include more or less information than described. The database is dynamic in that the geographical information contained therein, such as the preprogrammed, known segments, is capable of being updated and/or supplemented to thereby enhance the information accessible by navigation system 100, thereby improving the functionality of the navigation system 100 to perform various other functions. By way of example only, such functions may include generating a route prediction of a vehicle containing navigation system 100.

Navigation system 100 comprises a display 108 for providing visual output such as, for example, maps, navigation, entertainment, information, or a combination thereof. In the present example, display 108 is operable to provide a visual output of the preprogrammed segments and locations from the digital map. The display 108 is coupled to the communication path 104. Accordingly, the communication path 104 communicatively couples the display 108 to other modules of the navigation system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106. While the navigation system 100 includes a display 108 in the embodiment depicted in FIG. 1, the navigation system 100 may not include a display 108 in other embodiments, such as embodiments in which the navigation system 100 predicts a route based on turn determination and/or segment identification and automatically utilizes the predicted route to optimize a vehicle operating parameter based on the predicted route.

The depicted navigation system 100 comprises tactile input hardware 110 coupled to the communication path 104 such that the communication path 104 communicatively couples the tactile input hardware 110 to other modules of the navigation system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104. While the navigation system 100 includes tactile input hardware 110 in the embodiment depicted in FIG. 1, the navigation system 100 may not include tactile input hardware 110 in other embodiments, such as embodiments that do not include a display 108.

The navigation system 100 comprises a satellite antenna 114 coupled to the communication path 104 such that the communication path 104 communicatively couples the satellite antenna 114 to other modules of the navigation system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106.

The navigation system 100 can be formed from a plurality of modular units, i.e., the display 108, tactile input hardware 110 and satellite antenna 114, can be formed as modules that when communicatively coupled form the navigation system 100. Accordingly, in some embodiments, each of the modules can include at least one of the one or more processors 102 and/or the one or more memory modules 106. Accordingly, it is noted that, while specific modules may be described herein as including a processor and/or a memory module, the embodiments described herein can be implemented with the processors and memory modules distributed throughout various communicatively coupled modules. In embodiments where the navigation system 100 is coupled to a vehicle, the one or more processors 102 execute machine readable instructions to transform the global positioning satellite signals received by the satellite antenna 114 into data indicative of the current location of the vehicle.

Figure 2:
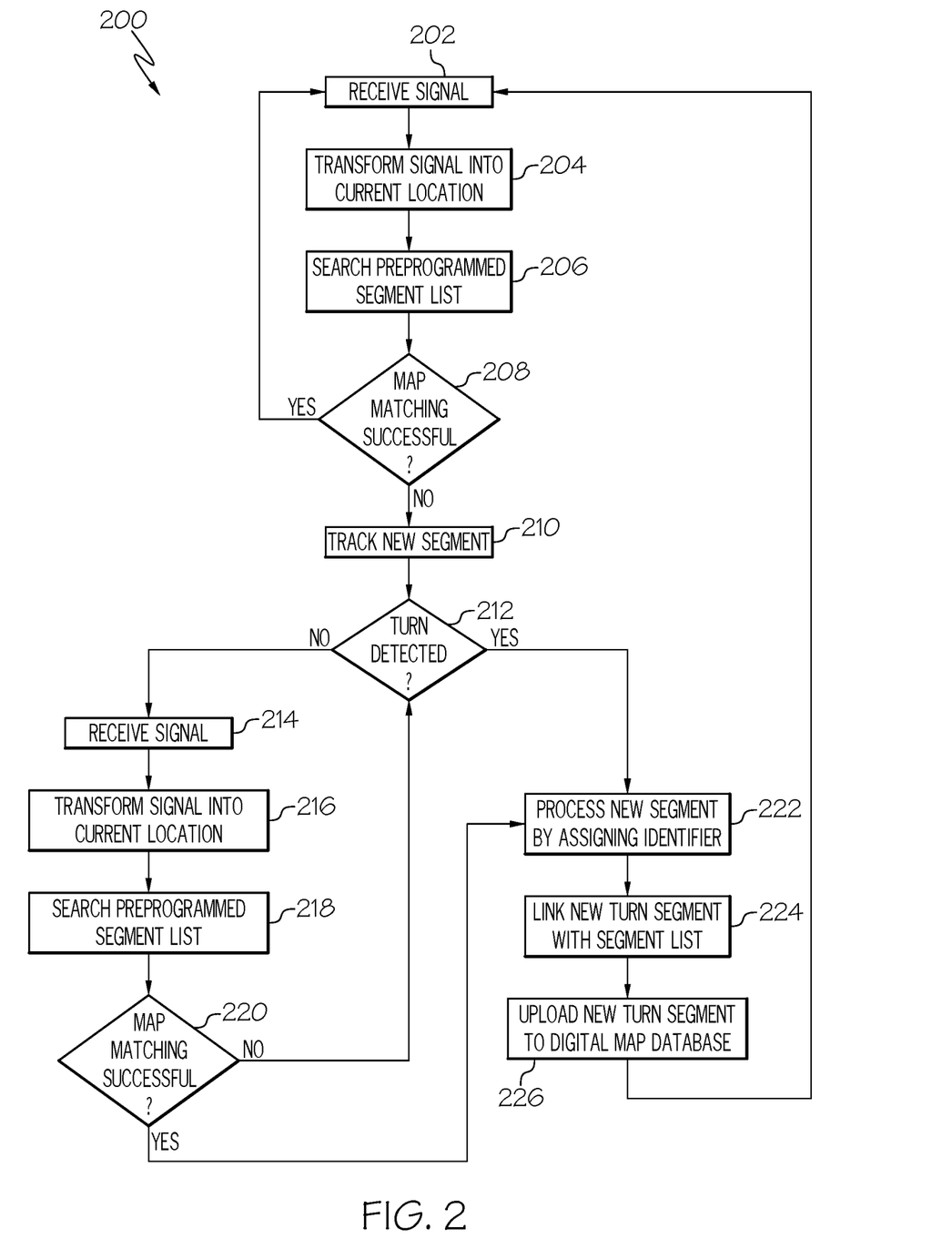
FIG. 2 schematically depicts a method for segmenting a map based on segment identification and turn detection according to one or more embodiments shown and described herein.

Referring to FIG. 2, an embodiment of a method 200 for tracking and generating turn segments in a navigation system 100 is shown for when a preprogrammed segment is not available in the digital map at the current location of the navigation system 100. In some embodiments, the method 200 may be implemented as logic within the machine readable instructions that, when executed by the one or more processors 102, automatically provides turn detection functionality. It is noted that, while the method 200 depicts steps following a specific sequence, additional embodiments of the present disclosure are not limited to any particular sequence.

At step 202 of the method 200, the satellite antenna 114 receives a signal from one or more global positioning satellites. In some embodiments, the satellite antenna 114 receives an electromagnetic signal with a conductive element. In the present example, navigation system 100 receives the signal automatically once navigation system 100 is activated. In the example of navigation system 100 being integral with a vehicle, satellite antenna 114 of navigation system 100 receives the signal upon starting the vehicle. It should be understood that in some examples, navigation system 100 may be activated at a point after the vehicle is started despite the navigation system 100 being integrally formed with the vehicle.

At step 204, the signal from the one or more global positioning satellites is transformed into a data signal indicative of a current location of the navigation system 100 at the time the signal is received. In one embodiment, the data signal indicative of the current location is capable of being transmitted over the communication path 104. For example, in some embodiments, the satellite antenna 114 may include a chipset that transforms the received electromagnetic signal into a data signal that is transmitted over the communication path 104 and processed by the one or more processors 102. Generally, the data signal indicative of the current location includes a latitude and a longitude of the navigation system 100. In some embodiments, the data signal indicative of the current location also includes an altitude. It should be understood that the data signal indicative of the current location may also include a heading and/or a speed, such as when the navigation system 100 is activated after the navigation system 100 (or the vehicle containing the navigation system 100 therein) is already in motion.

In other embodiments, the data signal indicative of the current location does not include a heading or a speed. In this instance, the navigation system 100 may calculate a heading and/or speed of the vehicle. For example, the navigation system 100 may include additional sensors (e.g., gyroscopes, accelerometers, or the like) configured to detect the heading and speed of the vehicle. Accordingly, in some embodiments, the current location can be based upon a combination of data including the detected speed, detected heading, detected latitude and longitude, and processing delay. In embodiments in which the navigation system 100 is coupled to a vehicle, the data signal includes a latitude and longitude of the vehicle such that the current location is a current location of the vehicle. In other embodiments, the navigation system 100 may be embedded in a mobile device (e.g., a smartphone) such that the current location is the current location of the mobile device.

Still referring to FIG. 2, at step 206, the machine readable instructions stored in the one or more memory modules 106, when executed by the one or more processors 102, cause the navigation system 100 to automatically search for a preprogrammed segment among a number of segment candidates that corresponds with the current location of the navigation system 100. In particular, each segment within the segment list comprises a plurality of geographical locations. This map-matching instruction involves navigation system 100 identifying at least one preprogrammed segment candidate by accessing the segment list stored in the one or more memory modules 106, and comparing the GPS data of the current location (e.g., the longitude and latitude coordinates) to the geographical information of each preprogrammed segment in the segment list to thereby determine whether a match exists. In other versions, navigation system 100 may determine the distance between the current location and the plurality of locations associated with each preprogrammed segment in the segment list to identify whether at least one segment candidate from the segment list has at least one location that is within a threshold distance from the current location. By identifying a preprogrammed segment having geographical information that is within the threshold distance from the current location, navigation system 100 may determine with greater confidence that the identified-preprogrammed segment is the current segment that the vehicle is currently located on. For example, in some embodiments the threshold distance may be 5 meters, such that any segment in the segment list having at least one location within 5 meters of the current location is identified as a segment candidate. In other embodiments, the threshold distance may differ from 5 meters, such as embodiments in which the threshold distance is 2 meters.

Accordingly, at step 208, the machine readable instructions stored in the one or more memory modules 106, when executed by the one or more processors 102, cause the navigation system 100 to determine whether a preprogrammed segment from the segment list is identified as segment candidate that matches the current location of the vehicle. In response to a successful match, the machine readable instruction of method 200 returns to step 202. In this instance, navigation system 100 continues to execute steps 202 to 208 when a preprogrammed segment corresponding to the current location is consistently identified from the segment list, thereby indicting that the navigation system 100 is effectively located on a street(s) that has been previously segmented (i.e. mapped) in the digital map.

Alternatively, when the analysis at step 208 concludes with a determination that a preprogrammed segment corresponding to the current location of the navigation system 100 was not identified from the segment list search of step 206, the logic of method 200 advances to step 210 where the machine readable instructions stored in the one or more memory modules 106 cause the navigation system 100 to initiate a tracking of a new segment not previously stored in the digital map.

Figure 3:
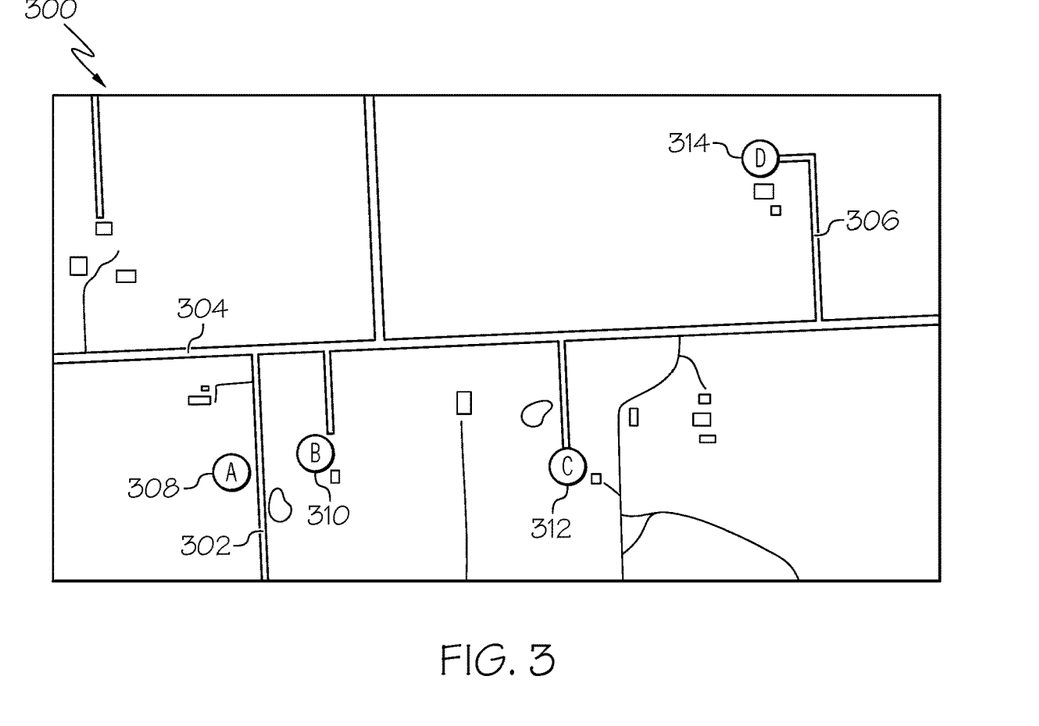
FIG. 3 schematically depicts a rural area having minimal preprogrammed turn segments.
Figure 4:
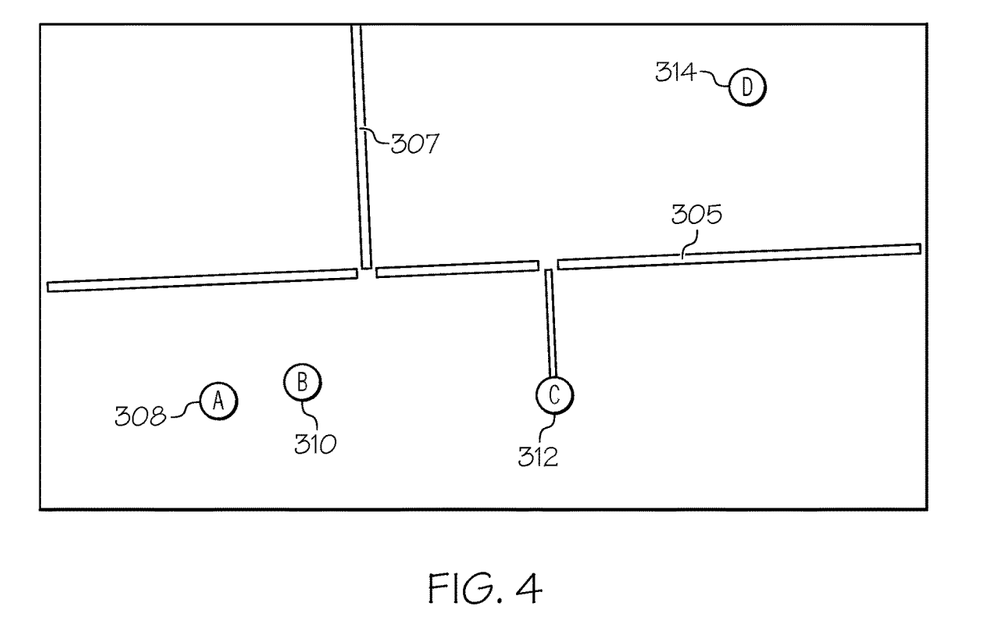
FIG. 4 schematically depicts a digital map of the rural area of FIG. 3, the digital map being a dynamic database of the navigation system of FIG. 1 according to one or more embodiments shown and described herein.

As merely an illustrative example, referring to FIGS. 3-4, a rural area 300 may include one or more streets 302, 304, 306 that interconnect one or more locations 308, 310, 312, 314. With rural area 300 being substantially underdeveloped and/or underpopulated, the digital map stored in the one or more memory modules 106 of navigation system 100 does not include a preprogrammed segment for every existing street 302, 304, 306 in area 300. Accordingly, as seen in FIG. 4, the digital map of navigation system 100 only includes some, if any, preprogrammed segments 305, 307 between all the locations 308, 310, 312, 314 in area 300. It should be understood that, although an underdeveloped rural area 300 is shown, the digital map of navigation system 100 may be devoid of preprogrammed segments in densely-populated areas as well, such as cities, towns, etc. By way of example only, the digital map of navigation system 100 may not include a preprogrammed segment in the segment list for an alleyway in a city, a parking lot at a strip mall, or a street in a residential neighborhood.

By way of further example, with navigation system 100 located at a first location 308 and an operator of navigation system 100 desiring to travel along streets 302, 304, 306 to reach a final location 314, navigation system 100 will be unable to identify a preprogrammed segment at step 208 for streets 302, 306. In this instance, as described above, the machine readable instructions causes navigation system 100 to initiate a tracking and recording of a new segment at step 210 as the vehicle containing navigation system 100 travels along street 302. As the new segment is tracked and recorded pursuant to step 210, the machine readable instructions causes the navigation system 100 to automatically monitor the movement of the vehicle at step 212 to detect if the vehicle makes any substantial turns. In the present example, a substantial turn may be determined as an input received from a change in course heading. In this instance, the current location data received from the signal includes a heading such that the one or more processors 102 cause the navigation system 100 to monitor and calculate, automatically, any difference in as navigation system 100 is in the tracking stage of step 210. The heading difference may be calculated by simply subtracting the current heading from a new heading or subtracting a newly-formed heading from the initial heading at the onset of the tracking stage. By way of example, the heading threshold may be 70 degrees such that the navigation system 100 determines that a turn has occurred when the difference in heading between a current heading and a new heading exceeds 70 degrees. However, it should be understood that in other embodiments the heading threshold may be greater than or less than 70 degrees. It should be understood that in other examples a substantial turn may be measured through other suitable methods, such as for example, by a video input received from one or more cameras positioned on the vehicle, a change in the relative orientation of a steering wheel of the vehicle as measured by sensors, a degree of wheel rotation, etc.

At steps 214 and 216, in response to navigation system 100 not detecting any substantial turns made by the vehicle, the method 200 will cause the navigation system 100 to continue to retrieve and transform a signal of the vehicle's current location to re-determine whether a preprogrammed segment is successfully identified, at step 218, while the vehicle is moving. Thus, navigation system 100 continues to perform steps 214 to 220 as the vehicle's current location changes while the vehicle is traveling along street 302. Simultaneous with the method of monitoring performed in steps 214 to 220, navigation system 100 continues to track the new segment pursuant the method in step 210 until either a substantial turn is detected at step 212 or a preprogrammed segment is identified from the segment list as corresponding to the current location of the navigation system, at step 220.

In the present example, referring again to FIG. 4, both scenarios may occur when the vehicle containing the navigation system 100 turns onto street 304 from street 302 to travel towards final location 314. Steps 222 to 226 may be performed in response to navigation system 100 determining that a substantial turn has occurred at step 212, or a preprogrammed segment has been matched to the current location of the vehicle at step 220. A new segment typically represents a geographic area between known, preprogrammed segments or an unknown area between detected turns of new segments. The newly tracked segment is processed by issuing a unique identifier to each new segment. In some embodiments, the new segment may include a starting location, an ending location, and a segment distance.

At step 224, the unique identifier of the initial, new turn segment is linked with the closest known segments from the segment list to thereby interconnect the new segment to the plurality of preprogrammed segments of the digital map. In the present example, the new segment may be associated with the nearest preprogrammed segment by comparing the geographical data assigned to each preprogrammed segment in the segment list with the location data of the new segment. Additionally, with the new segment interrelated with the plurality of preprogrammed segments pursuant to GPS data, the "to" segment list of the preceding preprogrammed segment relative to the new segment may be updated to include the new segment and the "from" segment list for the new segment may be updated to include the previous segment. In this instance, the new segment representing street 302 of area 300 will be linked to preprogrammed segment 305 of street 304 since the termination location of the new segment interrelates with the GPS data of preprogrammed segment 305.

At step 226, the new segment is uploaded onto the one or more memory modules 106, and in particular the dynamic database, to thereby amend the digital map with the new segment data. In the present example, an end node is created in the digital map along the segment way of preprogrammed segment 305 to indicate the point in which the new segment intersects with preprogrammed segment 305, thereby linking the two segments together. With the new segment populated into the digital map, any subsequent use of the digital map by the navigation system 100, and any other navigation systems in communication with the digital map, will benefit from the inclusion of the new data provided by the new segment. The new segment is stored in the digital map such that subsequent functions of the navigation system 100, such as performing route predictions, will utilize and identify the new segment as a preprogrammed segment within the segment list. With the new segment incorporated into the digital map of navigation system 100, the overall efficiency of the vehicle that navigation system 100 is associated with may be improved as the digital map is routinely updated with new geographical data.

With the new segment stored within the digital map, the logic of method 200 continues again at step 202 to identify whether the current location of the vehicle is now on a segment that is preprogrammed in navigation system 100 or whether the vehicle has continued onto another unknown street, in which a subsequent, new segment is to be immediately initiated and tracked. Accordingly, the machine readable instructions of method 200 cause navigation system 100 to continuously perform the steps outlined herein while navigation system 100 remains active and/or the vehicle containing navigation system 100 is in operation. In the example of FIGS. 3-4, navigation system 100 will identify preprogrammed segment 305 at step 206 such that a subsequent, new segment will not be generated as the vehicle containing navigation system 100 travels along street 304.

Once the vehicle reaches the intersection of streets 304, 306 and turns onto street 306, to reach final location 314, the method 200 will identify that a preprogrammed segment does not exist for the current location of the vehicle on street 306 such that step 208 will lead to an unsuccessful map matching. Accordingly, at step 210, navigation system 100 will automatically commence the recording of a subsequent, new segment. As similarly described above, the machine readable instructions will cause navigation system 100 to monitor the vehicle's current travel movements to determine the beginning and end of the new segment. In particular, the method 200 will determine the extent of the new segment by identifying if a turn is made (step 212) or if the vehicle's location aligns with a preprogrammed segment (step 220). Upon the vehicle reaching the final location 314, the method 200 will generate the newly completed segment by assigning a unique identifier to the segment at step 222. This new segment will be linked to the nearest preprogrammed segment at step 224, which in the present example may be preprogrammed segment 305 which represents street 304 in area 300. With preprogrammed segment 305 being previously linked to the initial, new segment representing street 302, the subsequent new segment of street 306 is not linked to the initial new segment of street 302 through their common linkage with segment 305.

In some embodiments, after a new segment is tracked, generated and uploaded onto the digital map pursuant to steps 222 to 226, a graphical indication of the new segment may be automatically presented on the display 108 of navigation system 100. In one embodiment, the navigation system 100 may receive input from a driver or passenger that is indicative of a confirmation that the newly generated segment is correct via input hardware, which may include a touch screen, the tactile input hardware 110. In response to receiving input indicative of a confirmation that the new segment is correct, the navigation system 100 may adjust a vehicle operating parameter.

In some embodiments, navigation system 100 may predict a route comprising a plurality of preprogrammed segments such that navigation system 100 may be operable to adjust vehicle operating parameters (e.g., a battery state of charge, a hybrid vehicle mode, a transmission gear, etc.) based on the predicted route. In such embodiments, a powertrain control module may be communicatively coupled to the one or more processors 102 and may adjust the vehicle operating parameter. In one embodiment in which a vehicle is a hybrid electric vehicle, the battery state of charge may be adjusted based on the predicted route or the hybrid vehicle may enter electric vehicle mode based on the predicted route. In embodiments in which a vehicle operating parameter is adjusted based on the predicted route, the vehicle operating parameter may be adjusted only when a calculated route confidence level exceeds a confidence threshold, which may avoid potential degradation in vehicle performance if an incorrect route is predicted.

It should be understood that embodiments described herein provide for navigation systems and vehicles for generating new turn segments based on turn detection and/or segment identification. The navigation systems and vehicles provided herein may permit a segment to be mapped and created based on turn determination and/or segment identification utilizing simple GPS data. Moreover, the navigations systems and vehicles provided herein may permit a vehicle operating parameter to be adjusted based on predicting a route comprising preprogrammed segments, which may enhance vehicle performance and operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A navigation system for generating turn segments, comprising:
   a processor;
   a memory module communicatively coupled to the processor;
   a segment list stored in the memory module, wherein the segment list includes a plurality of known segments; and
   machine readable instructions stored in the memory module that causes the navigation system to perform at least the following when executed by the processor:
      identify a current location of the navigation system;
      search the segment list for at least one known segment candidate that is within a threshold distance of the current location;
      determine whether at least one known segment candidate from the segment list includes the current location;
      track turn movements of the navigation system to detect a turn and, in response to detecting a turn, to form an unknown segment upon determining at least one known segment candidate does not include the current location; and
      detect another turn and, only in response to detecting the another turn, link the unknown segment to the plurality of known segments from the segment list.

2. The navigation system of claim 1, wherein the machine readable instructions stored in the memory module further cause the navigation system to repeatedly determine whether at least one segment candidate from the segment list includes an updated location in response to determining at least one segment candidate does include the current location.

3. The navigation system of claim 1, wherein the threshold distance is about 2 meters to about 5 meters.

4. The navigation system of claim 1, wherein the machine readable instructions stored in the memory module further causes the navigation system to assign an identifier to the unknown segment.

5. The navigation system of claim 4, wherein the machine readable instructions stored in the memory module further causes the navigation system to dynamically store the unknown segment in the memory module such that the unknown segment is included in the segment list.

6. The navigation system of claim 5, wherein the machine readable instructions stored in the memory module further causes the navigation system to communicate the segment list including the unknown segment to the satellite antenna.

7. The navigation system of claim 1, wherein to link a location of the unknown segment to the one or more known segments from the segment list comprises linking an identifier of the unknown segment with identifiers of the one or more known segments that have a preprogrammed location within the threshold distance of the unknown segment.

8. The navigation system of claim 1, further comprising a satellite antenna communicatively coupled to the processor, wherein the satellite antenna receives a signal from a global positioning system satellite.

9. The navigation system of claim 8, wherein the machine readable instructions stored in the memory module further causes the navigation system to transform the signal into a current location of the navigation system.

10. The navigation system of claim 1, wherein the machine readable instructions stored in the memory module further causes the navigation system to predict a travel route based on the segment list and the unknown segment.

11. The navigation system of claim 10, wherein the machine readable instructions stored in the memory module further causes the navigation system to adjust a vehicle operating parameter based on the predicted travel route.

12. The navigation system of claim 11, wherein the vehicle operating parameter is a battery state of charge.

13. The navigation system of claim 1, wherein the processor is integrally secured to a vehicle.

14. The navigation system of claim 1, wherein the processor is integrally secured to a mobile device.

15. A method for segmenting a route in a mapping system for an unknown area, the method comprising:
   receiving a signal at a navigation system from a GPS satellite;
   processing the signal into a current geographical location of the navigation system;
   accessing a segment list stored within a memory of the navigation system, wherein the segment list comprises a plurality of known segments that includes geographical location data;
   determining whether at least one known segment from the segment list includes geographical location data that is identical to the current geographical location of the navigation system;
   recording a new segment for storage in the memory of the navigation when at least one known segment does not include geographical location data that is identical to the current geographical location of the navigation system;
   monitoring physical turns of the navigation system;
   terminating the new segment only in response to detecting a physical turn by the navigation system; and
   linking the new segment to at least one known segment from the segment list only in response to detecting the physical turn.

16. The method of claim 15, further comprising linking the current geographical location to the new segment.

17. The method of claim 16, further comprising associating the new segment to the plurality of known segments by relating the current geographical location to the geographical location data.

18. A vehicle comprising:
a system comprising a processor and a memory module, wherein the memory module is communicatively coupled to the processor and includes a plurality of known segments and logic instructions stored therein, wherein the plurality of known segments each comprise geographical data, wherein the processor is operable to execute the logic instructions to:
identify a current location of the vehicle;
compare the current location to the geographical data of the plurality of known segments to determine if the geographical data of at least one known segment is similar to the current location;
record an unknown segment for storage in the memory module when the current location is dissimilar from the geographical data of the plurality of known segments by a predetermined threshold; and
link the unknown segment to the plurality of known segments only in response to detecting a turn.

19. The vehicle of claim 18, wherein the processor is operable to monitor and detect a new turn by the vehicle after initiating recording of the unknown segment.

20. The vehicle of claim 18, wherein the unknown segment is added to the plurality of known segments stored in the memory module such that the unknown segment is thereby categorized as one of the known segments of the plurality of known segments.

* * * * *

UNITED STATES PATENT AND TRADEMARK OFFICE
CERTIFICATE OF CORRECTION

| | |
|---|---|
| PATENT NO. | : 11,897,446 B2 |
| APPLICATION NO. | : 16/125956 |
| DATED | : February 13, 2024 |
| INVENTOR(S) | : Joshua D. Payne and Heraldo Stefanon |

It is certified that error appears in the above-identified patent and that said Letters Patent is hereby corrected as shown below:

On the Title Page

Column 1, item (56), U.S. patents, cite no. 1, delete "Chojnacki" and insert --Chojnacki et al.--, therefore.

In page 2, Column 1, item (56), U.S. patents documents, cite no. 5, delete "Dufford" and insert --Dufford et al.--, therefore.

In page 2, Column 1, foreign patent documents, cite no. 1, delete "IN" and insert --CN--, therefore.

In the Claims

In Column 12, Line(s) 58, Claim 15, after "navigation", insert --system--.

Signed and Sealed this
Twenty-fifth Day of June, 2024

Katherine Kelly Vidal
*Director of the United States Patent and Trademark Office*